W CLAYTON.
Car Brake.

No. 4,701.

Patented Aug. 18, 1846.

UNITED STATES PATENT OFFICE.

WILLIAM CLAYTON, OF MARSHALLTON, PENNSYLVANIA.

BRAKE FOR CARRIAGES.

Specification of Letters Patent No. 4,701, dated August 18, 1846.

*To all whom it may concern:*

Be it known that I, WILLIAM CLAYTON, of Marshallton, in the county of Chester and State of Pennsylvania, have invented a new and useful Brake for Arresting the Motion of Railroad Cars and other Wheeled Vehicles, which is described as follows, reference being had to the annexed drawings of the same, making part of this specification.

Figure 1:
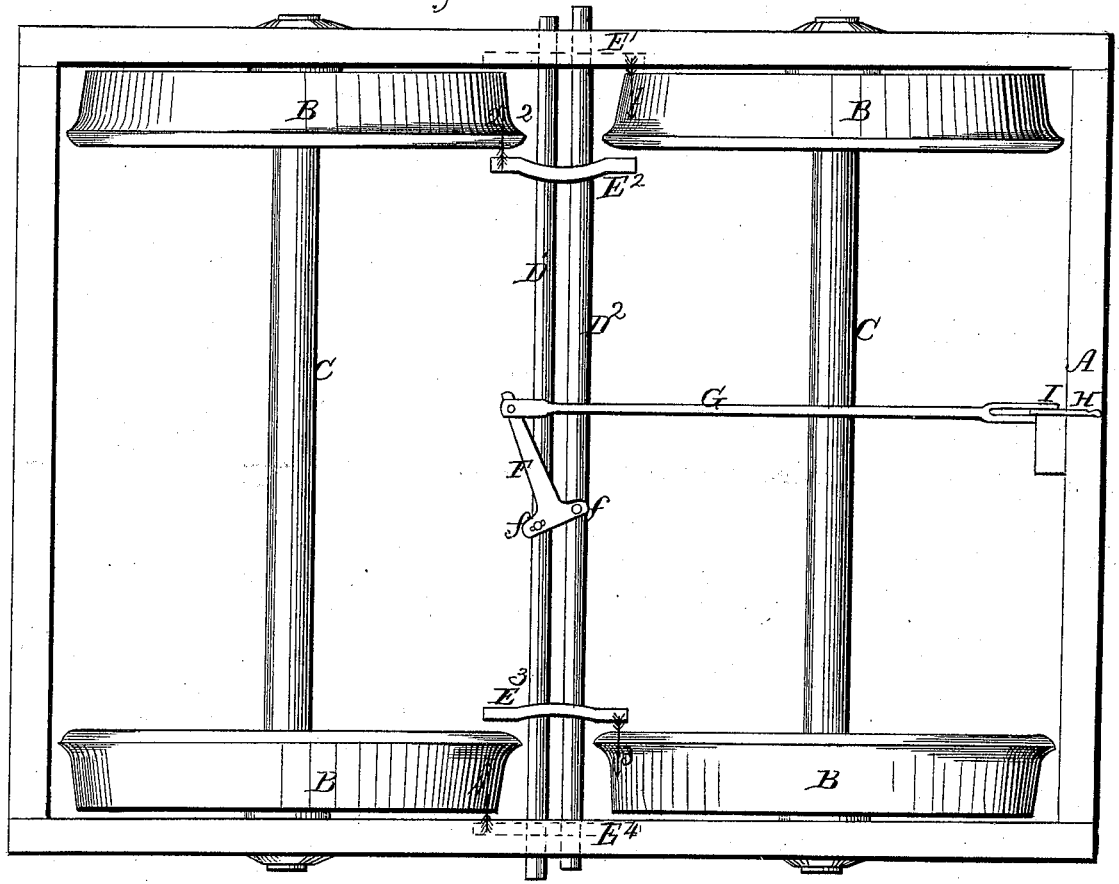
Figure 2:
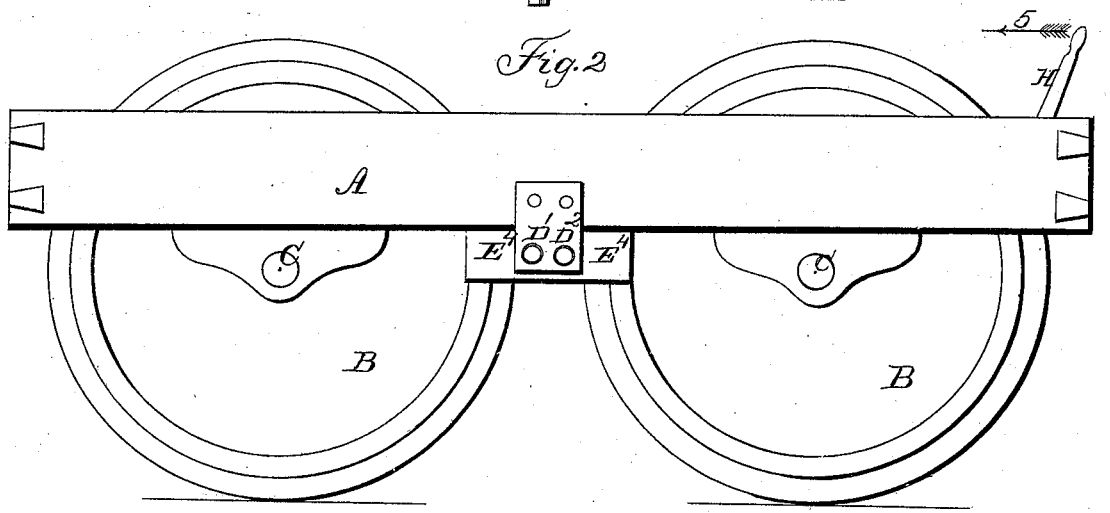

Figure 1 is a top view, or plan of the brake, as applied to a railroad car.—Fig. 2 is a side elevation.

This brake consists of two horizontal parallel sliding bars arranged between the wheels below the frame made to slide alternately and transversely back and forth in corresponding openings in plates fastened to the frame, or in suitable boxes, by a right angled connecting rod connected by pins to the said bars and operated or vibrated back and forth by means of a connecting rod and vibrating lever working on a fulcrum attached to the frame, two rubbers being attached to each rod on the outside and inside of the edges of the wheels so as to produce eight rubbing surfaces simultaneously against the inner and outer faces of the wheels instead of the peripheries of the wheels as in the old plan—each bar working through the rubber of the corresponding bar on the inside of the wheels—so that as the lever is moved toward the car for the purpose of arresting its motion the four rubbers will be caused to embrace or grip the edges of the wheels in the manner of a vise or pair of tongs.

A is the frame of the car; B, the wheels; C, axles.

$D^1$ $D^2$ are the parallel transverse bars.

$E^1$ $E^2$ $E^3$ $E^4$ are the rubbers through which the bars pass.

F is the right angled connecting rod perforated with a round hole for one of the pins $f$ and an oblong slot for the other.

$f$ $f$ are the pins that connect the right angled rod and parallel bars together and which serve as fulcra for said rod.

G is a connecting rod.

H is the vibrating lever.

I is the fulcrum of the lever H.

When the lever H is moved in the direction of the arrow No. 5 the rubbers will move simultaneously toward the wheels—the rubber $E^1$ moving in the direction indicated by the arrow No. 1—and the rubber $E^2$ in the direction of the arrow No. 2—the rubber $E^3$ in the direction of the arrow 3—and the rubber $E^4$ in the direction of the arrow 4. The bar $D'$ moves loosely through the rubbers $E^1$ and $E^3$, and the bar $D^2$ moves loosely through the rubber $E^2$ and $E^4$. The rubber $E^1$ and $E^3$ are fixed to the bar $D^2$. And the rubbers $E^2$ and $E^4$ are fixed to the bar $D^1$.

The above described mode of constructing a brake possesses advantages over the old mode inasmuch as it diffuses the friction on the 4 wheels simultaneously and produces no additional strain on the axles and enables the brakeman to stop the motion of the train suddenly or gradually as he pleases.

The old mode causes the friction to be against the peripheries of 2 wheels instead of against the 8 sides of 4 wheels. The old mode increases the strain on the axle of the 2 wheels and renders it liable to break and puts it out of the power of the brakeman to arrest the momentum of the train suddenly.

The parallel bars may be moved simultaneously the one to the right and the other to the left by a simple lever attached to the bars by pins which serve as fulcra for said lever. The bars may also be moved by other means equally effective on the same principle.

What I claim as my invention and desire to secure by Letters Patent is—

Constructing the brake in the manner described to grip the rims of the wheels and apply the friction to the sides thereof (instead of the peripheries) or other mode substantially the same, by which analogous results are produced.

WILLIAM CLAYTON.

Witnesses:
WM. P. ELLIOT,
A. EUGENE H. JOHNSON.